United States Patent Office 3,202,568
Patented Aug. 24, 1965

3,202,568
SAFETY GLASS AND ITS PRODUCTION
Emile Clement Cottet, Lyon, Henri Rhety, Venissieux, and Aime Louis Rocher, Ste. Colombes-les-Vienne, France, assignors to Societe des Usines Chimiques Rhone-Poulenc, Paris, France, a French body corporate
No Drawing. Filed Mar. 8, 1961, Ser. No. 94,165
Claims priority, application France, Mar. 31, 1960, 823,025
12 Claims. (Cl. 161—193)

This invention relates to the production of safety glass and to safety glass so obtained.

It has long been known to manufacture safety glass consisting of two glass sheets between which there is disposed a plastic reinforcing sheet or layer which is shock-resistant and strongly attached to the glass sheets by sticking.

When the safety glass is subjected to shocks, the glass sheets break, but the splinters thus formed remain stuck to the plastic sheet, which is not broken by the shock, and consequently no injury due to cutting by flying glass splinters can occur.

Naturally, it is most desirable that the adhesion of the plastic reinforcing sheet to the glass sheets should be very strong, so that no glass splinters can be detached from the reinforcing sheet, even under the most violent shocks.

In the safety glass at present employed, notably for windows in automobile bodies, the plastic reinforcing sheet generally consists of a plastic sheet from 0.4 to 0.6 mm. thick, based upon plasticized polyvinyl butyral. The average percentage composition of the polyvinyl butyral used is as follows:

| | Percent |
|---|---|
| Polyvinyl butyral | 78 to 80 |
| Polyvinyl alcohol | 18 to 20 |
| Polyvinyl acetate | 2 to 0.1 |

The sheets of this butyral which are employed as reinforcing sheets may be obtained by any appropriate method from plasticised mixtures containing from 70% to 80% of the polyvinyl butyral and 20% to 30% of a plasticiser (e.g. triethylene glycol diethylbutyrate, butyl sebacate, etc.).

Safety glass is manufactured from these plasticised butyral sheets by disposing them between two glass sheets and sticking them thereto by means of heat and pressure.

Now, it sometimes happens that in the application of the process just described for the manufacture of safety glass insufficient adhesion of the plastic reinforcing sheet to the glass is obtained, so that in impact tests glass splinters become detached and may cause accidents. This is all the more serious from the viewpoint of safety since this defect cannot be detected in the completed glass by any examination other than the impact test.

The causes of this insufficient adhesion are not well known. It can merely be stated that the defect generally arises in the case of reinforcing sheets made from butyrals containing a low percentage (less than 2%) of polyvinyl acetate. Unfortunately, butyrals of this composition are precisely those most favoured on other grounds, because they give non-tacky sheets which are easy to handle.

It may also happen that the lack of adhesion does not become apparent immediately after manufacture, but some time later when the glass is in service, which is even more serious, because it escapes any detection during manufacture. In this case, the defect may be revealed by detachment of the glass sheets from the plastic sheet along the edges of the safety glass, which gives the latter a bad appearance, while at the same time the parts thus detached may give rise to dangerous glass splinters under impact.

It has now been found that it is possible to obviate the aforesaid defects and to obtain regularly in the manufacture of safety glass reinforced by polyvinyl butyral excellent and lasting adhesion of the reinforcing sheet to the glass by incorporating in the polyvinyl butyral composition a proportion of an organic ester of silicic acid of appropriate nature.

Silicic esters have already been proposed for improving the adhesion of plastic sheets to glass in the manufacture of safety glass, but they have not been incorporated in the reinforcing sheet itself. In fact, the silicic esters previously employed were generally methyl silicate or ethyl silicate, that is to say, relatively volatile products which were added to solvent or plasticiser baths employed as ancillaries in the manufacture of safety glass. Such a method of use is not suitable for the industrial manufacture of safety glasses having a reinforcing sheet consisting of plasticised polyvinyl butyral, in which the so-called "dry" sticking method is employed, which involves only the action of heat and pressure.

The organic silicic esters employed in the present invention must be of such low volatility as not to evaporate under the normal conditions of manufacture, storage and use of the reinforcing sheets. Also, they must not cause irregularities, notably blistering, in the course of the manufacture of the safety glass or subsequently in the course of its use. These criteria are satisfied by silicic acid esters of organic hydroxy compounds having at least three carbon atoms in the molecule. The proportion of silicic esters added to the plasticised polyvinyl butyral composition is lower than or equal to 2.5% of the weight of the latter, but usually above 0.1% and preferably above 0.5%. The maximum proportion of 2.5% must not be exceeded, because this would give rise to the danger of clouding in the reinforcing sheet. The latter may be produced by any appropriate means (extrusion, calendering or film casting) from the plasticised polyvinyl butyral composition containing the silicic ester.

Organic silicates particularly suitable for use in accordance with the invention are the silicic esters of aliphatic alcohols (especially the alkanols) containing from 3 to 6 carbon atoms and the silicic esters of ethers of glycol, notably the butyl ether silicate. Silicic esters of alcohols having more than 6 carbon atoms are not suitable because, in the proportion in which they must be added to plasticised butyral compositions, they produce clouding in the safety glass.

The following example illustrates the invention.

Example

There is produced by homogenisation in a mixer, followed by extrusion at elevated temperatures, a plasticised polyvinyl butyral sheet, having a thickness of 0.5 mm., from the following composition:

| | Percent |
|---|---|
| Polyvinyl butyral | 75 |
| Triethyleneglycol diethyl acetate | 23 |
| Butyl silicate | 2 |

The percentage composition of the polyvinyl buytral is:

| | |
|---|---|
| Polyvinyl butyral | 79.8 |
| Polyvinyl alcohol | 20 |
| Polyvinyl acetate | 0.2 |

The butyral sheet is placed between two glass sheets 2.5 mm. thick, and the safety glass is obtained by heating the assembly in vacuo and then under pressure, as described in French patent specification No. 1,095,476.

There is thus obtained a safety glass having excellent transparency which is not fragmented in the impact test (i.e. by a steel ball weighing 1 kg. falling from a height of 1.50 m. onto a specimen of the safety glass measuring 30 x 30 cm. held in a frame). In this test, no glass splinter becomes detached and no detachment can be observed between the glass and the reinforcing sheet even under repeated impacts.

A standard safety glass prepared under the same conditions but without the addition of butyl silicate exhibits in the aforesaid impact test considerable detachment of the plastic reinforcing sheet from the glass, and glass splinters become detached from the reinforcing sheet around the point of impact of the steel ball.

We claim:

1. Safety glass comprising a reinforcing sheet of a plasticized polyvinyl butyral composition containing 0.5% to 2.5% of its weight of an orthosilicic acid ester of an organic hydroxy compound having at least 3 carbon atoms in the molecule the said sheet being interposed between and adhering to two glass sheets.

2. Safety glass according to claim 1, wherein the orthosilicic acid ester is an orthosilicate of an aliphatic alcohol containing 3 to 6 carbon atoms in the molecule.

3. Safety glass according to claim 2, wherein the orthosilicic acid ester is butyl orthosilicate.

4. Safety glass according to claim 1, wherein the orthosilicic acid ester is an orthosilicate of a monoether of ethylene glycol.

5. Safety glass according to claim 4, wherein the orthosilicic acid ester is the orthosilicate of the monobutyl ether of ethylene glycol.

6. Safety glass according to claim 1, wherein the polyvinyl butyral contains at most 2% of polyvinyl acetate.

7. In a process for the production of safety glass by assembling a sheet of glass on either side of a sheet of a plasticized polyvinyl butyral and subjecting the assembly to heat and pressure to cause the glass sheets to adhere to the polyvinyl butyral sheet, the improvement which consists in employing a polyvinyl butyral sheet which contains 0.5% to 2.5% of its weight of an organic ester of orthosilicic acid which is insufficiently volatile to be lost by evaporation during the manufacture, storage and use of such sheet.

8. Process according to claim 7, wherein the orthosilicic ester is an orthosilicate of an aliphatic alcohol containing 3 to 6 carbon atoms in the molecule.

9. Process according to claim 8, wherein the orthosilicic acid ester is butyl orthosilicate.

10. Process according to claim 7, wherein the orthosilicic acid ester is the orthosilicate of a mono ether of ethylene glycol.

11. Process according to claim 10, wherein the orthosilicic acid ester is the orthosilicate of the monobutyl ether of ethylene glycol.

12. Process according to claim 7, wherein the polyvinyl butyral contains at most 2% of polyvinyl acetate.

References Cited by the Examiner

UNITED STATES PATENTS

| | | | |
|---|---|---|---|
| 2,360,650 | 10/44 | Crane | 161—199 |
| 2,408,655 | 10/46 | Iler et al. | 161—193 |
| 2,946,711 | 7/60 | Bragow et al. | 161—199 |
| 3,051,054 | 8/62 | Crandon | 156—106 |

FOREIGN PATENTS 586,028  3/47  Great Britain.

EARL M. BERGERT, *Primary Examiner.*

CARL F. KRAFFT, *Examiner.*